Aug. 9, 1960 E. F. EGER ET AL 2,948,086
SELECTIVELY OPERABLE WORK HOLDERS FOR BUFFING MACHINES
Filed May 3, 1957 2 Sheets-Sheet 1
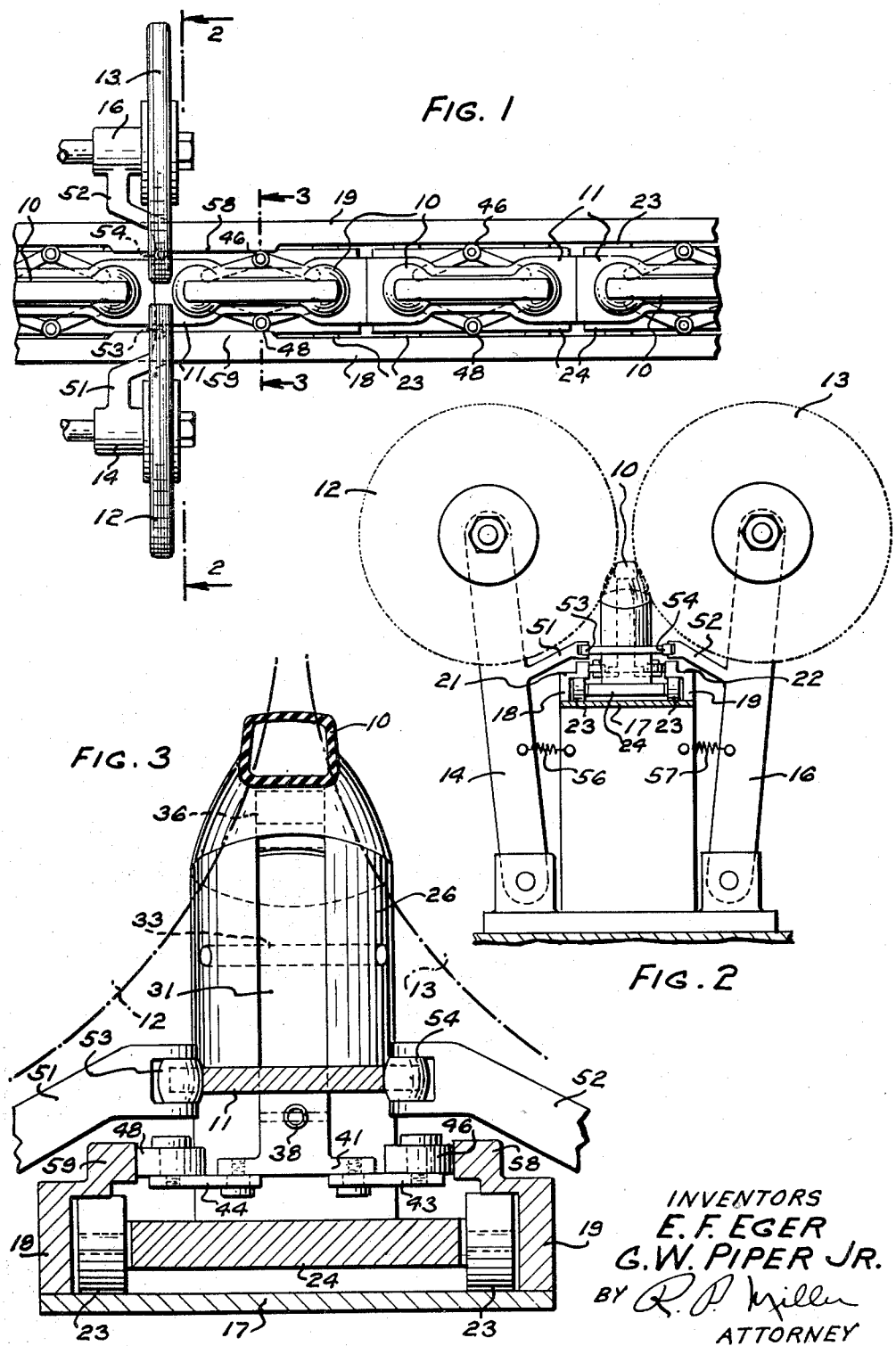
INVENTORS
E. F. EGER
G. W. PIPER JR.
BY
ATTORNEY

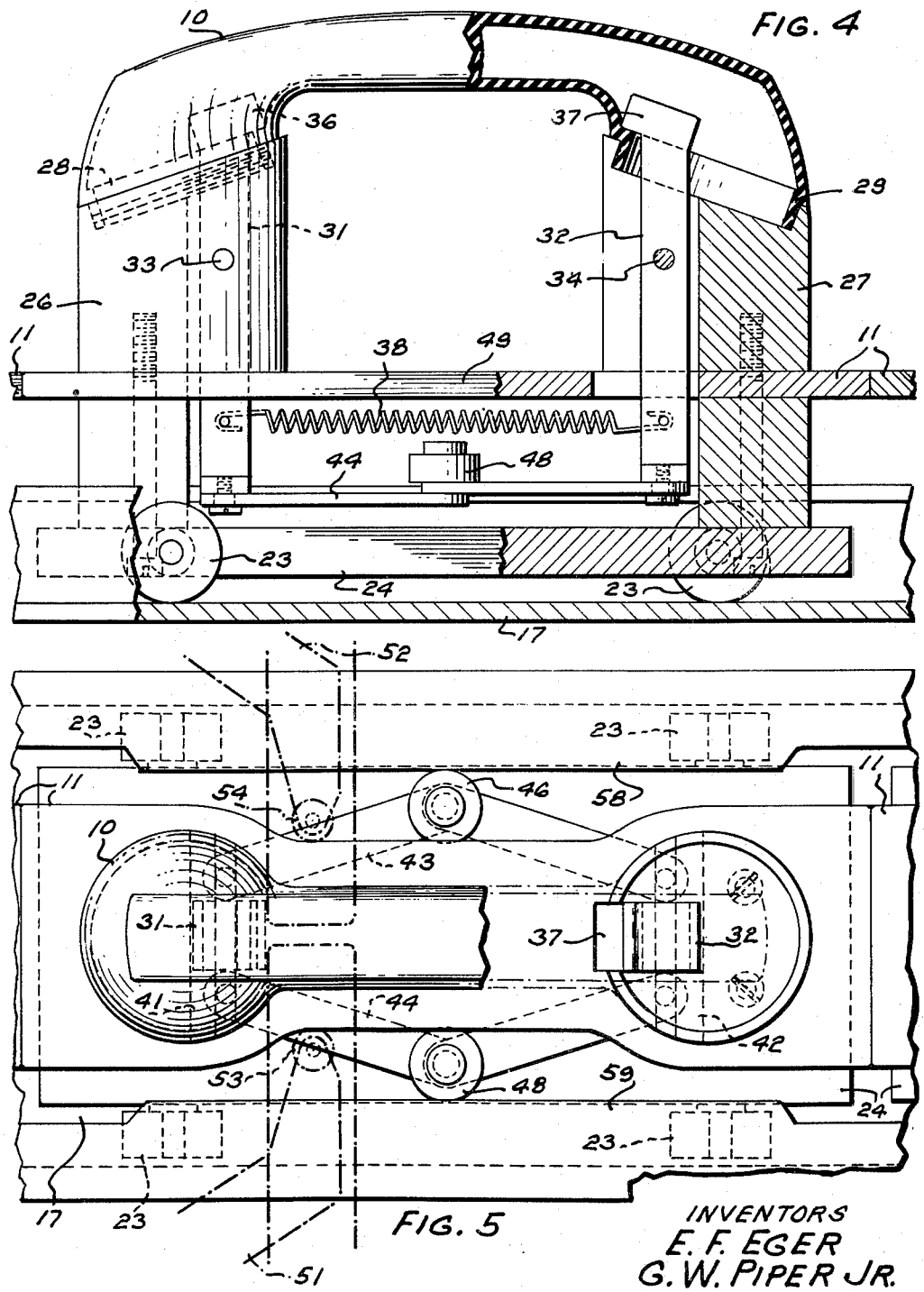

United States Patent Office 2,948,086
Patented Aug. 9, 1960

2,948,086

SELECTIVELY OPERABLE WORK HOLDERS FOR BUFFING MACHINES

Edward F. Eger and George W. Piper, Jr., Indianapolis, Ind., assignors to Western Electric Company, Incorporated, New York, N.Y., a corporation of New York Filed May 3, 1957, Ser. No. 656,826

7 Claims. (Cl. 51—80)

This invention relates to selectively operable work holders for gripping articles, and more particularly to work holders having selectively actuatable gripping facilities for holding articles during buffing operations.

In operation of automatic fabricating systems having conveying means for carrying the work pieces from one work location to another, it is desirable that said work pieces be loosely carried between the various work stations. This feature will permit the selective removal of the work pieces between each work station for inspection purposes or for purposes of removing defective work pieces. However, as the work piece is moved through the work stations, it is necesary that each work piece be securely gripped to permit operations thereon by various fabricating tools.

It is a prime object of the present invention to provide a simple and economical work holder adapted to be selectively actuated to grip an article while work operations are being performed thereon.

Another object of the invention is to provide a system of moving work holders for advancing articles through a fabricating station whereat facilities are rendered effective to successively actuate mechanisms on each work holder to securely grip each article during the time that a work operation is being performed thereon.

Still another object of the invention is to provide a mobile work holder having a toggle controlled gripping means for securely holding a handle of a telephone handset during simultaneous buffing operations on both sides of the handle.

An additional object of the instant invention is the provision of cam means positioned on a trackway for simultaneously actuating a pair of toggle linkages to move a pair of grippers into engagement with spaced portions of an article to be buffed.

With these and other objects in view, the present invention contemplates the use of a series of work carriers for successively advancing work pieces in the form of handles for telephone handsets past a series of pivotally mounted spring-biased buffing wheels. As each carrier moves past the buffing wheels, cam means mounted on the carrier controls the positionment of the buffing wheels in conformance with the contour of the handle. Further cam means are provided to render effective a gripping mechanism to securely grip the handle during buffing operations.

Other objects and advantages of the present invention will be apparent from the following detailed description when considered in conjunction with the accompanying drawings, wherein Fig. 1 is a top plan view of a system for successively conveying articles to a buffing station embodying the principal features of the present invention;

Fig. 2 is a side elevational view partially in section illustrating a carrier moving an article through the buffing station;

Fig. 3 is an enlarged cross-sectional view taken along line 3—3 of Fig. 1 of one of the carriers for holding an article;

Fig. 4 is a side elevational view partially cut away to illustrate a gripping mechanism for holding the article on the carrier, and Fig. 5 is a top view illustrating the toggle actuating means for the gripping means.

Referring first to Figs. 1 and 2, plastic handles 10 to be used in the construction of telephone handsets are loaded on carriers 11 and advanced by suitable power means (not shown) past a pair of oppositely disposed constantly running buffing wheels 12 and 13. These buffing wheels are respectively rotatably mounted on the ends of a pair of lever-like support members 14 and 16. A suitable drive (not shown) is either mounted on the support members 14 or 16 or in a position adjacent to the buffing wheels to provide power to constantly rotate the buffing wheels. The carriers 11 are adapted to move along a guideway arrangement consisting of an elevated platform 17 having a pair of upwardly extending guide rails 18 and 19. Each guide rail 18 and 19 has an inwardly extending flange section respectively designated by the reference numerals 21 and 22, adapted to encompass and retain the rollers 23 mounted on a base frame 24 (see Fig. 3) of each carrier 11.

Referring now to Figs. 3, 4 and 5, it will be noted that the base frame 24 has mounted thereon a pair of upwardly extending posts 26 and 27 each of which is apertured at the upper extremity thereof to respectively receive a transmitting portion 28 and a receiving portion 29 of the telephone handset handle 10. Each post 26 and 27 is slotted to accommodate a pair of levers 31 and 32 pivotally mounted about pivot pins 33 and 34. The upper extremity of each of the levers 31 and 32 extends within apertures formed in the handle 10 and is provided with gripping elements 36 and 37. Interconnecting the levers 31 and 32 is a tension spring 38 adapted to normally move the gripping elements 36 and 37 from engagement with the handle 10. Looking more particularly at Figs. 3 and 5, it will be noted that the levers 31 and 32 have plates 41 and 42 secured to the lower extremities thereof. A pair of toggle linkages 43 and 44 pivotally interconnect the plates 41 and 42. At each of the toggle knee joints is mounted a cam follower roller designated respectively by the reference numerals 46 and 48. It may be appreciated that upon application of forces to the rollers 46 and 48, the toggles 43 and 44 will move toward the straight line position, and as a consequence, pivot the gripping members 36 and 37 toward each other into gripping relation with the inside of the handle 10.

Each carrier 11 has also mounted thereon a cam plate 49 having a general contour of a handle 10. Referring again to Figs. 1 and 2, it will be noted that each of the supports 14 and 16 has laterally projecting arms 51 and 52 on which are mounted cam follower rollers 53 and 54 adapted to follow the contour of the plate 49. Further, each of the supports 14 and 16 is urged toward the other by means of springs 56 and 57, and thus the buffing wheels 12 and 13 are continuously urged into engagement with handles 10 as they are advanced therepast. It may be thus understood that as each carrier 11 moves past the buffing wheels 12 and 13, the support means for the buffing wheels will be moved inwardly and outwardly in conformance with the contour of the plate 49 and the general contour of the handle 10. Manifestly, each of the handles will be uniformly buffed upon movement of each carrier through the buffing station.

It should be also understood that the present arrangement may be utilized to advance the handles 10 past more than one buffing station, and that at these subsequent buffing stations the buffing wheels may be angularly disposed with respect to the handles so that different surface areas of each handle are buffed.

Attention is again directed to Figs. 1 and 2 wherein there is shown stationary cam elements 58 and 59 mounted on the inwardly extending flanges 21 and 22. These cams are positioned to cooperate and actuate the cam follower rollers 46 and 48 to actuate the gripping members 36 and 37 as each carrier is moved past the buffing wheels 12 and 13. It should be observed that handles 10 that are not being buffed are mounted on carriers wherein the gripping members 36 and 37 are not engaging the handles; thus, these handles may be readily removed by an attendant for purposes of inspection.

It is to be understood that the above-described arrangements of apparatus and construction of elemental parts are simply illustrative of an application of the principles of the invention and many other modifications may be made without departing from the invention.

What is claimed is:

1. In a carrier system for advancing articles past a movably mounted fabricating device, a plurality of article carriers each having selectively operable article gripping means, a trackway for guiding said carriers past the fabricating device, means actuated by movement of the carriers past the fabricating device for operating said gripping means, and means mounted on said carrier for controlling the positionment of said movably mounted fabricating device.

2. In a conveyor system for advancing work pieces to a pair of pivotally mounted buffing wheels, a series of work holders having rollers mounted thereon, a trackway having upwardly and inwardly extending flanges for encompassing and guiding said rollers, a pair of article gripping members pivotally mounted on each work holder, a mechanism mounted on and extending from each of said work holders for operating the gripping member to grip an article placed on the work holder, and means carried by each work holder for shifting the buffing wheels as the gripping members are operated.

3. A carrier system for conveying articles between a pair of movably mounted fabricating devices comprising a trackway positioned between said fabricating devices, a plurality of movable work holders positioned in said trackway for movement between said fabricating devices, means mounted on each of said holders adapted to support an article and for gripping the article, a toggle joint mechanism mounted on each holder for actuating the gripping means, means for retaining said gripping means and toggle joint mechanism in an unoperated position, means for applying a force on the toggle knee as the holder is moved between the fabricating devices to operate the gripping means, and means on the holders for moving the fabricating devices as each holder is moved therepast.

4. A work holder for supporting and conveying an article past an adjustable article-fabricating device comprising, a movably mounted frame having a pair of article-supporting posts, a gripper member pivotally mounted within each post for selectively securing the articles to the posts, means on the frame for urging said members to a non-gripping position, means actuated by the conveyance of the frame to the fabricating device for moving said members to a gripping position, and means mounted on said frame for adjusting the fabricating device upon movement of the frame thereby to perform a fabricating operation on the article.

5. A conveyor system for advancing and supporting articles having apertures in the extremities thereof between a pair of pivotally mounted buffing wheels, which comprises a series of article carriers having rollers mounted thereon, a trackway having flanges thereon for encompassing and guiding said rollers to move the article carriers between the buffing wheels, a pair of spaced supporting posts extending from each carrier having slots formed therein for supporting an article at the apertured extremities thereof, a pair of levers pivotally mounted in the slots and adapted to extend into the apertures formed in the article for securely gripping and clamping the article to the posts within the apertures, spring biased means for urging the levers in the non-gripping position, first camming means mounted on the trackway for pivoting the levers to a gripping position against the force of the spring biased means upon each carrier passing between the buffing wheels, resilient means for urging the buffing wheels into engagement with each article passing therebetween, and a second camming means mounted on each carrier having substantially the same contour as the article for positioning the buffing wheels in relation to the contour of the articles.

6. In a carrier system for advancing an article past a movably mounted fabricating device, an article carrier having selectively operable article gripping means, a trackway for guiding said carrier past the fabricating device, means actuated by the movement of the carrier past the fabricating device for operating said gripping means, and means mounted on said carrier for controlling the positionment of said movably mounted fabricating device.

7. A carrier system for conveying articles between a pair of movably mounted fabricating devices, comprising a trackway positioned between said fabricating devices, a plurality of movable work holders positioned in said trackway for movement between said fabricating devices, means mounted on each of said holders adapted to support an article and for gripping the article, means mounted on each holder for actuating the gripping means, means for retaining said gripping means and the means for actuating the gripping means in an unoperated position, means for applying a force on the means for actuating the gripping means for operating the gripping means, and means on the holders for moving the fabricating devices as each holder is moved therepast.

References Cited in the file of this patent

UNITED STATES PATENTS

| 1,258,001 | Hammersmith | Mar. 5, 1918 |
| 1,645,600 | Kohler | Oct. 18, 1927 |
| 1,920,076 | Happel | July 25, 1933 |